(12) United States Patent
DeMers et al.

(10) Patent No.: US 8,777,074 B2
(45) Date of Patent: Jul. 15, 2014

(54) HITCH-MOUNTED TELESCOPIC RACK AND METHOD OF USE

(76) Inventors: Michael Thomas DeMers, Incline Village, NV (US); James Kevin Redmond, Truckee, CA (US)

( * ) Notice: Subject to any disclaimer, the term of this patent is extended or adjusted under 35 U.S.C. 154(b) by 261 days.

(21) Appl. No.: 13/280,324

(22) Filed: Oct. 24, 2011

(65) Prior Publication Data

US 2012/0098235 A1  Apr. 26, 2012

Related U.S. Application Data

(60) Provisional application No. 61/405,729, filed on Oct. 22, 2010.

(51) Int. Cl.
*B60D 1/00* (2006.01)
*B60R 9/042* (2006.01)
*B60R 9/045* (2006.01)

(52) U.S. Cl.
CPC . *B60D 1/00* (2013.01); *B60R 9/042* (2013.01); *B60R 9/045* (2013.01)
USPC ............ 224/310; 224/497; 224/519; 414/462

(58) Field of Classification Search
CPC ........... B60D 1/00; B60R 9/042; B60R 9/045
USPC ............ 224/310, 497, 519; 280/504; 414/462
See application file for complete search history.

(56) References Cited

U.S. PATENT DOCUMENTS

| | | | |
|---|---|---|---|
| 3,672,549 A * | 6/1972 | Chorey | 224/310 |
| 3,917,094 A * | 11/1975 | Magneson | 414/462 |
| 3,976,213 A * | 8/1976 | Ball | 414/462 |
| 4,046,273 A | 9/1977 | Hughes | |
| 4,058,243 A * | 11/1977 | Tappan | 224/310 |
| 4,380,344 A | 4/1983 | Abbott | |
| 4,412,635 A | 11/1983 | Bateman | |
| 4,682,719 A * | 7/1987 | Ernst et al. | 224/310 |
| 4,728,244 A | 3/1988 | Stokkendal | |
| 5,228,607 A | 7/1993 | Tolsdorf | |
| 5,423,566 A | 6/1995 | Warrington et al. | |
| 5,454,496 A | 10/1995 | Sumida et al. | |
| 5,458,389 A | 10/1995 | Young | |
| 5,469,933 A * | 11/1995 | Thomason | 182/127 |
| 5,615,813 A | 4/1997 | Ouellette | |
| 5,632,591 A * | 5/1997 | Henriquez | 414/462 |
| 5,649,656 A * | 7/1997 | Davy | 224/405 |
| 5,678,743 A | 10/1997 | Johnson et al. | |

(Continued)

*Primary Examiner* — Brian D Nash
(74) *Attorney, Agent, or Firm* — Long & Chybik; John D. Long, Esq.

(57) ABSTRACT

One possible embodiment of the invention could be a hitch-mounted telescopic rack and its operation, the rack could be comprised of a vertical telescopic tube assembly having an inner tube movably received within a hollow outer tube, the hollow outer tube having a hitch attachment end while the inner tube has an attachment end that connects to a top tube assembly that movably supports one or more rollers perpendicularly to the vertical telescopic tube assembly; wherein the hitch attachment end is reversibly received by a trailer hitch of an automotive vehicle to vertically orient the vertical telescopic tube assembly and place the rollers in a horizontal position distal from the trailer hitch, the one or more rollers moving an object relative to a rear edge of a top of the automotive vehicle as well as supporting the rear overhanging portion of the object that is placed on the top.

12 Claims, 16 Drawing Sheets

(56) References Cited

U.S. PATENT DOCUMENTS

| | | |
|---|---|---|
| 5,685,686 A | 11/1997 | Burns |
| 5,752,639 A | 5/1998 | Rice |
| 5,788,135 A | 8/1998 | Janek |
| 5,884,824 A | 3/1999 | Spring, Jr. |
| 6,129,371 A | 10/2000 | Powell |
| 6,139,247 A * | 10/2000 | Wright .......................... 414/462 |
| 6,279,801 B1 | 8/2001 | Harrison |
| 6,296,290 B1 | 10/2001 | Wolf |
| 6,315,181 B1 * | 11/2001 | Bradley et al. ............... 224/310 |
| 6,511,088 B2 | 1/2003 | Kahlstorf |
| 6,662,983 B2 | 12/2003 | Lane et al. |
| 6,682,086 B1 | 1/2004 | Erickson |
| 6,688,428 B2 * | 2/2004 | Carroll, Jr. .................. 182/127 |
| 7,036,698 B2 | 5/2006 | Allen |
| 7,097,408 B2 | 8/2006 | Paxton |
| 7,195,262 B2 | 3/2007 | Chaudoin et al. |
| 7,469,806 B2 | 12/2008 | Garoffolo |
| 2002/0125281 A1 * | 9/2002 | Byrnes .......................... 224/310 |
| 2004/0213655 A1 | 10/2004 | Buckner et al. |
| 2004/0219003 A1 * | 11/2004 | Bik et al. ..................... 414/462 |
| 2005/0023314 A1 | 2/2005 | Williams et al. |
| 2005/0077335 A1 | 4/2005 | Bourne |
| 2005/0082329 A1 * | 4/2005 | Cohen .......................... 224/519 |
| 2007/0090139 A1 | 4/2007 | McKenzie |
| 2007/0108246 A1 | 5/2007 | Jennings et al. |
| 2007/0175936 A1 | 8/2007 | Goyanko |
| 2008/0061097 A1 | 3/2008 | Milender et al. |
| 2009/0261136 A1 | 10/2009 | Skoff |
| 2010/0193555 A1 | 8/2010 | Gift |

* cited by examiner

HITCH-MOUNTED TELESCOPIC RACK AND METHOD OF USE

CROSS-REFERENCES TO RELATED APPLICATION

This application claims the benefit under 35 U.S.C. §119 (e) of U.S. Provisional Patent Application No. 61/405,729 filed on Oct. 22, 2010, the contents of which are relied upon and incorporated by reference.

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention relates to telescopic racks that can be hitch-mounted to an automotive vehicle. In particular, to those telescopic racks that may be used to move objects relative to a top of the automotive vehicle and to further support such objects once otherwise located upon the top of the automotive vehicle.

BACKGROUND

Automotive vehicles, generally those vehicles that are wheeled and self-propelled, may used to carry wide variety of objects that are too large or long to be carried inside the automotive vehicle. These objects may include sporting equipment (e.g., canoes, kayaks; standup paddle boards, surf boards, dinghies, etc.), construction materials (plywood sheets, piping, lumber, etc.); tools (e.g., extension ladders, scaffolding, etc.); home furnishings (mattresses, bed frames, book cases, etc.); seasonal decorations (e.g., Christmas trees, outside decorations, etc.); and the like. The dimensions of these objects may dictate they be secured to the top or roof of a vehicle (e.g., attached or secured to a top [e.g., a roof rack.])

Two issues may arise as a result of this type of transportation. First, the act of placing such objects upon the automotive vehicle's top, due to object's bulk weight and the height of the automotive vehicle (e.g., vans, minivans, sports utility vehicles, etc.), may require considerable exertion and effort to do so, especially if only one person is loading the object upon the top. If the loading is not performed competently, it could also result in damage to automotive vehicle or the object, or worse, result in personal injury.

The second issue in the use of such transport could occur when the loaded object(s) is longer in length than length of the top or roof of the automotive vehicle. In such aspects, the rear portion of the object could overhang from the vehicle top. This overhanging rear portion of the top-loaded object could have serious impact on the load stability of the object when traveling at high speeds. At such speeds, the accumulating wind pressure upon a front portion of the top-loaded object, in combination with the object's overhang, could cause the object to shift or otherwise fall off the moving automotive vehicle. At the very least, rear overhanging top objects could call the attention of law enforcement to a potentially unsafe driving situation and possibly leading to the issuance of a traffic citation to the driver.

What could be needed is a telescopic rack that could attach to a trailer or tow hitch of an automotive vehicle to adjustably present a top tube assembly with one or more rollers in a horizontal orientation distal from the trailer hitch. For the loading or unloading operations, the telescopic rack could be placed in a more compact position, height wise, locating the top tube assembly below the height of vehicle's top. This positioning could allow the operator to place an object (that is to be loaded upon the top of the automotive vehicle) so that the object's front portion rests upon the telescopic rack's roller(s). By lowering a rear portion of the object relative to the top tube assembly, the operator could then angle the object's front portion upwards towards a rear edge of the automotive vehicle's top. As the operator moves the object along the one or more rollers, the object (e.g., the front portion) could engage the rear edge of the vehicle's top (e.g., the roof rack) and then move past the rear edge and over the top. As the object's movement continues, a center of gravity (e.g., middle portion) of object could engage and then pass over the rear edge generally allowing the weight of the object to then drop the front portion upon the top or roof, placing most of the object upon the top of the vehicle. The telescopic rack could then be extended lengthwise so that the top tube assembly may engage and support the overhanging rear portion of the object as loaded upon the top.

SUMMARY OF ONE EMBODIMENT OF THE INVENTION

Advantages of One or More Embodiments of the Present Invention

The various embodiments of the present invention may, but do not necessarily, achieve one or more of the following advantages:

to substantially provide an hitch-mounted telescopic rack that can be used both to facilitate the angled movement of an object relative to the top of an automotive vehicle and to support an overhanging portion of the object once placed upon the top;

the ability to significantly reduce exertion and strain on an operator placing an object upon top of automotive vehicle through the use of adjustable height rollers to guide an angled movement of the object relative to the rear edge of the top of the automotive vehicle;

to substantially provide a simple, lightweight, inexpensive hitch-mounted telescopic rack whose height can be adjusted to allow the rack to change functions from supporting an object upon an automotive vehicle top to moving the object relative to the automotive vehicle's top; and the ability to load and unload an object relative to an automotive vehicle top by using a rollers of a hitch-mounted rack to move and pivot an object relative to the rear edge of the top of the automotive vehicle.

These and other advantages may be realized by reference to the remaining portions of the specification, claims, and abstract.

Brief Description of One Embodiment of the Present Invention

One possible embodiment of the invention could be a hitch-mounted telescopic rack comprising of a hitch-mounted telescopic rack comprising of a vertical telescopic tube assembly having an inner tube and a hollow outer tube, the hollow outer tube having a receiving end and a hitch attachment end, the inner tube having an attachment end and a movable end, the movable end being movably received within the receiving end of the hollow outer tube; a top tube assembly attaching to the attachment end of the inner tube and supporting one or more rollers; wherein the hitch attachment end is reversibly received within and secured to the trailer hitch of an automotive vehicle to vertically orient the vertical telescopic tube assembly and to horizontally place the one or more rollers distally from the trailer hitch to allow the one or more rollers to be used to move an object relative to a rear edge of a top of the automotive vehicle.

Another possible embodiment of the invention could be a process of operating hitch-mounted telescopic rack comprising of providing a telescopic rack, the rack comprising of a top tube assembly with one or more rollers and a vertical telescopic tube assembly, the top tube assembly attaches in a perpendicular orientation to a one end of a vertical telescopic tube assembly while the other end of the vertical telescopic tube assembly is reversibly attached to a tow hitch of an automotive vehicle; providing an automotive vehicle having a top with a rear edge, the vehicle further having a tow hitch; providing an object to be loaded on the top of the automotive vehicle, the object having a front portion, center of gravity, and a rear portion; adjusting the length of the vertical telescopic tube assembly to place the rollers at a suitable height for an angled loading of the object up over the rear edge to the top of the automotive vehicle; placing the front portion upon the rollers; lowering the rear portion below the rollers to angle up the front portion towards the rear edge of the top of the automotive vehicle; and moving the object along the rollers in an angled manner to project up the front portion towards the rear edge.

Yet another possible embodiment of the invention could be a combination of telescopic rack and an automotive vehicle with a tow hitch comprising of a telescopic rack having a vertical telescopic tube assembly and a top tube assembly, the vertical telescopic tube assembly having a hitch attachment end and a supporting end, the supporting end perpendicularly attaches the vertical telescopic tube assembly to a top tube assembly that movably supports one or more rollers; an automotive vehicle having a tow hitch and top with a rear edge; wherein the telescopic rack is connected by the hitch attachment end to the tow hitch so as to place the vertical telescopic tube assembly in a vertical position with the one or more rollers in a horizontal position, allowing an object to move along and rotate the one or more rollers, the rollers allowing the object to move in angled manner for passage over the rear edge to allow the object to rest upon the top of the automotive vehicle.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

Figure 1:
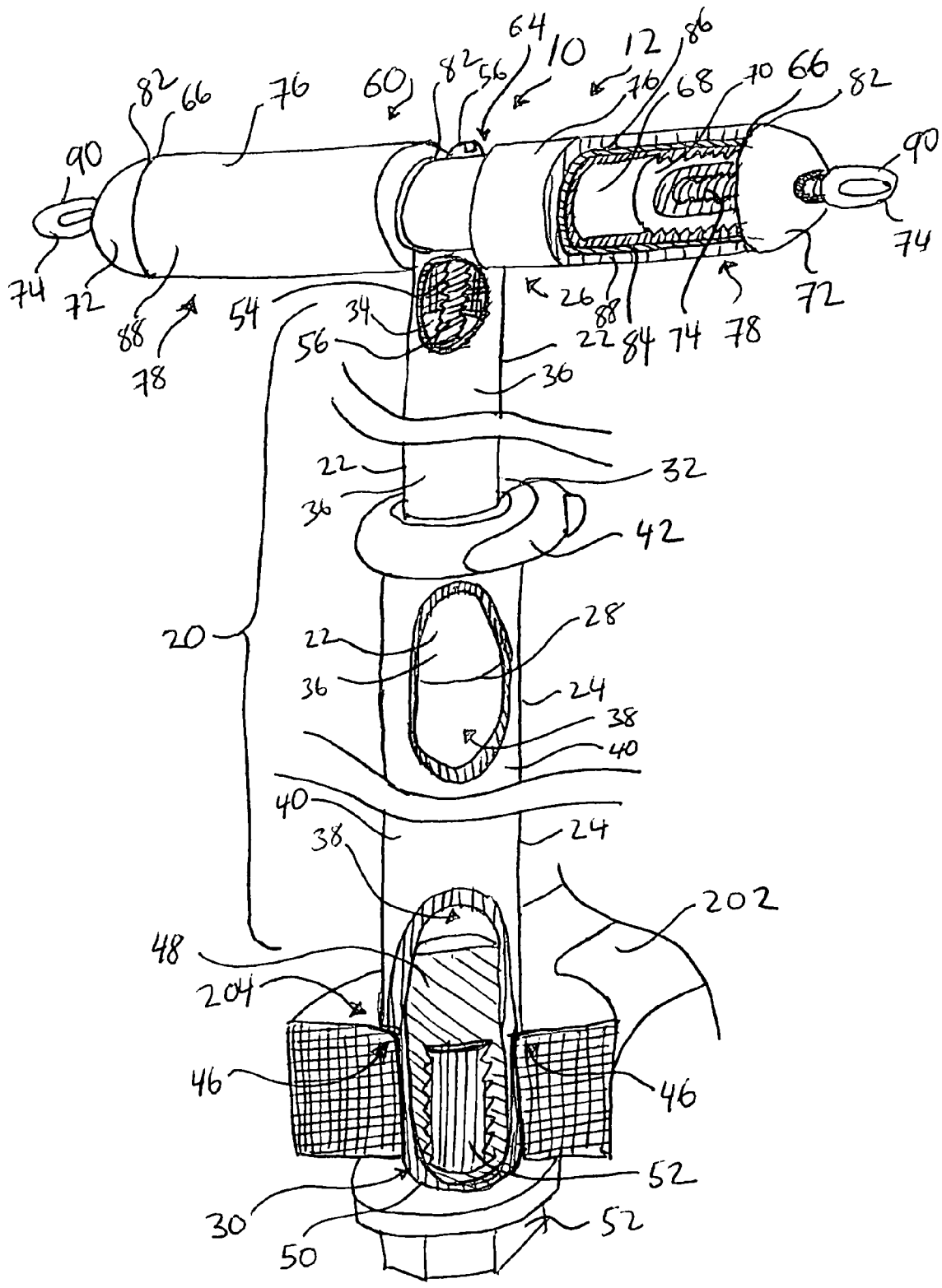
FIG. 1 is substantially a perspective cutaway of the present invention.

DESCRIPTION OF CERTAIN EMBODIMENTS
OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention 10 could comprise a hitch-mounted telescopic rack 12 and a methodology 100 for using it to load, unload, and support objects 210 located placed on a top 206 of an automotive vehicle 200 (e.g., a self-propelled wheel vehicle) fitted with a trailer or tow hitch 202. The objects 210 could be longer in length than the interior passenger compartment of the vehicle to the extent that when the object 210 placed on the top 206 of the automotive vehicle 200, the object 210 could overhang the rear of the vehicle 200. The rack 12 could assist an operator 300 in moving the object 210 relative to the rear edge 208 of the top 206 of the automotive vehicle 200 utilizing an angled movement (e.g., angled away from horizontal or the ground) and a pivoting action. The object 210 could have a front portion 212, a center of gravity 216 (e.g., middle portion) and a rear portion 214.

Figure 2:
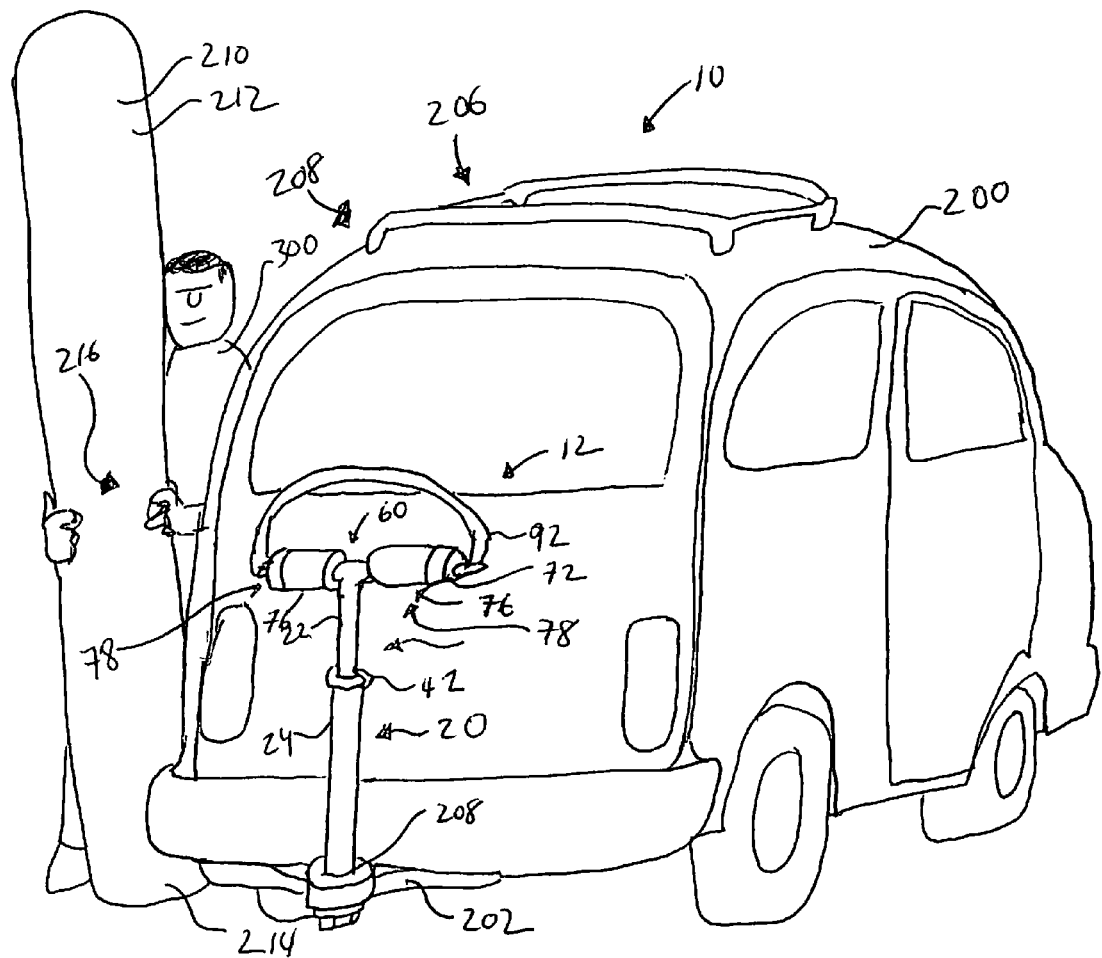
FIG. 2 is substantially a perspective view of the present invention attached to a tow hitch of an automotive vehicle.
Figure 3:
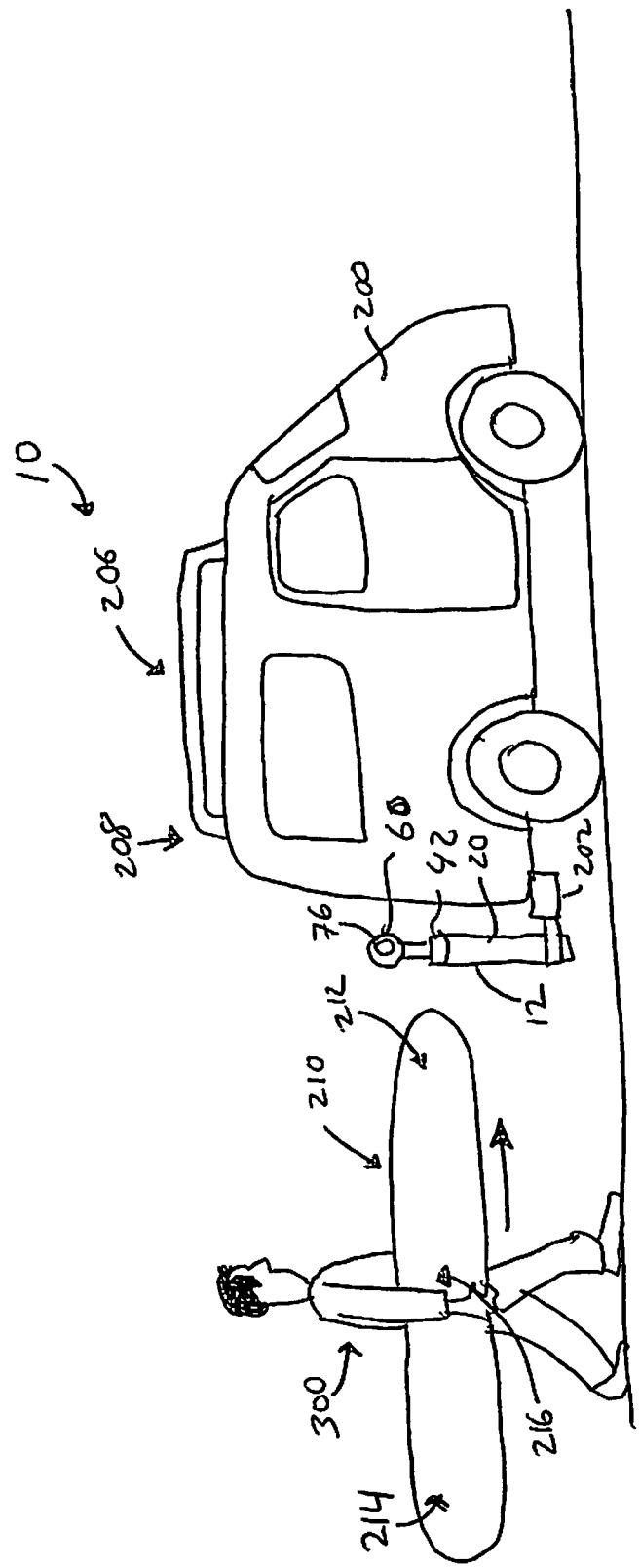
FIG. 3 is substantially an elevation view of the operator bring the object proximate to the invention.
Figure 4:
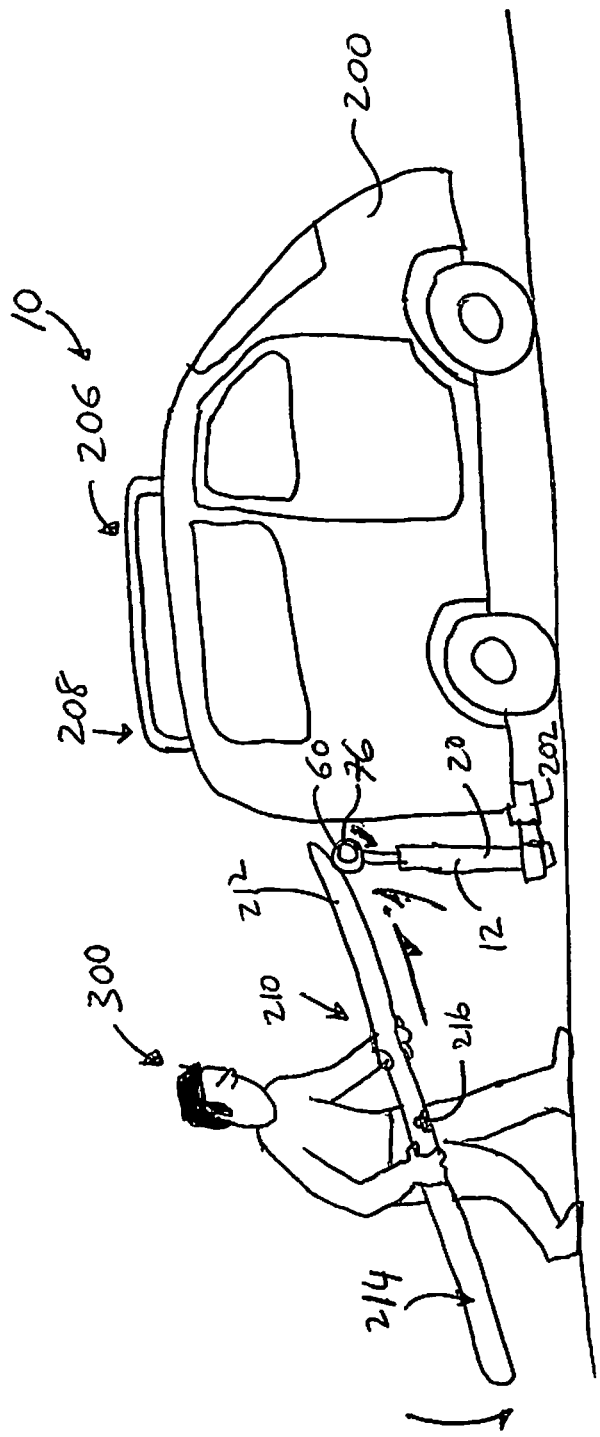
FIG. 4 is substantially an elevation view of the operator placing and the front portion of the object upon the rollers of the rack.
Figure 5:
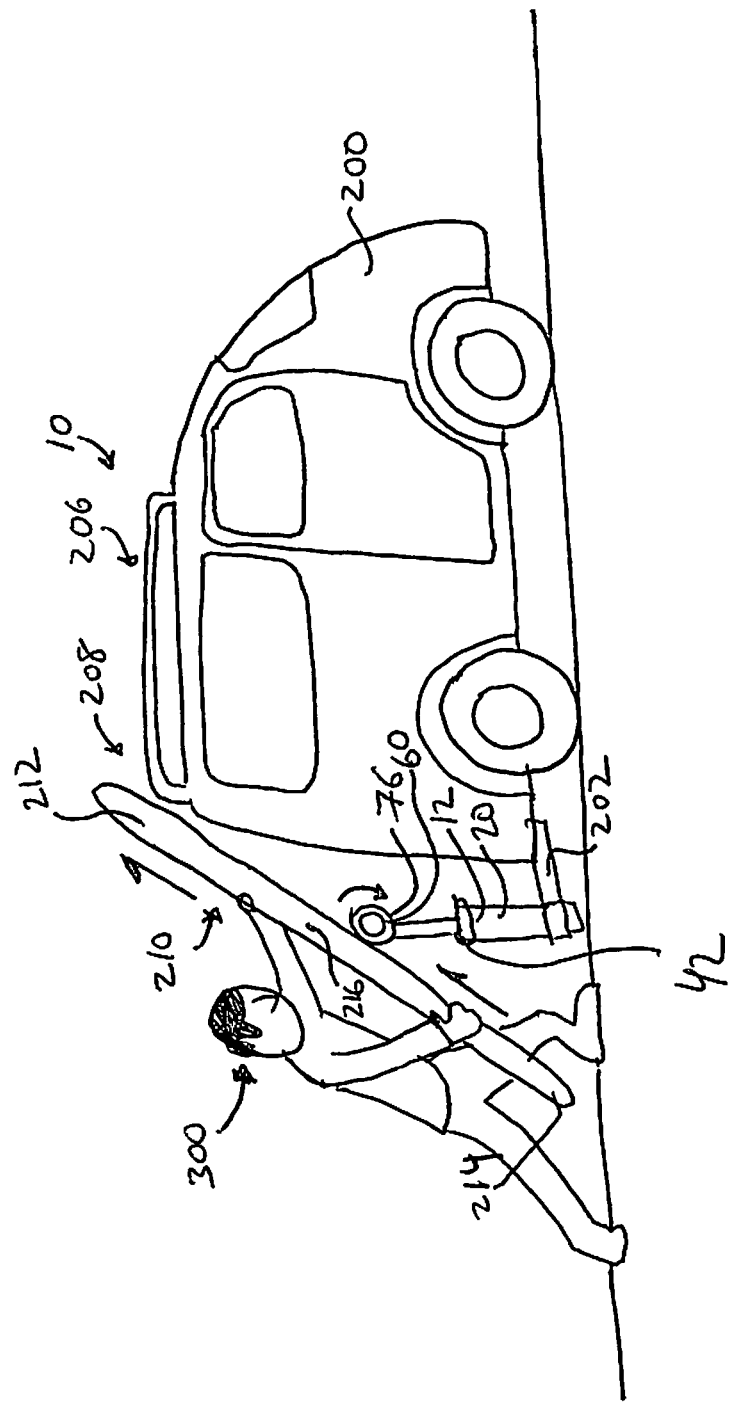
FIG. 5 is substantially an elevation view of the operator rolling the object on the rack to angle and direct the front portion towards the rear edge of the top of the vehicle.
Figure 6:
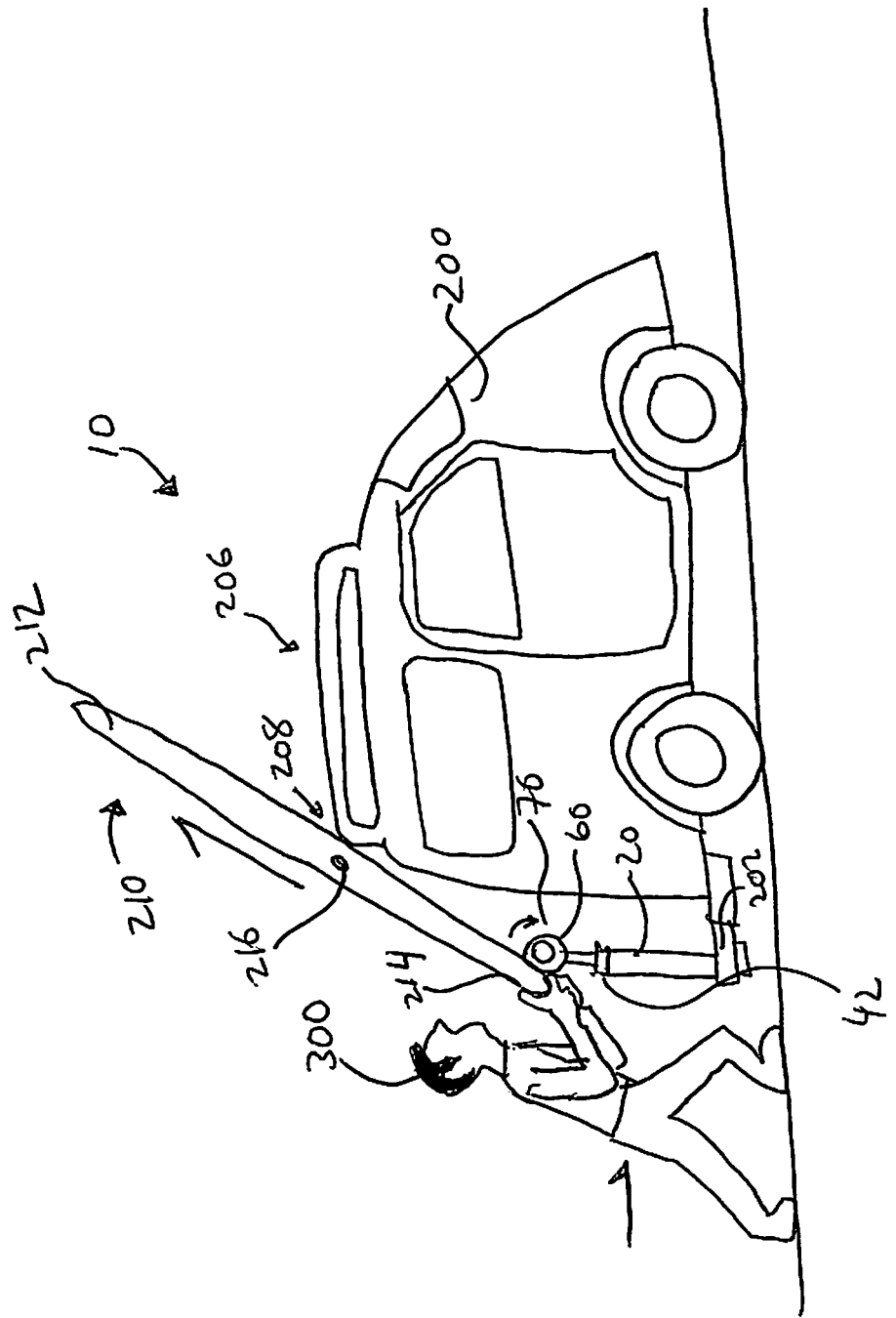
FIG. 6 is substantially an elevation view of the operator rolling the object on the rack as the object engages the rear edge of the vehicle.
Figure 7:
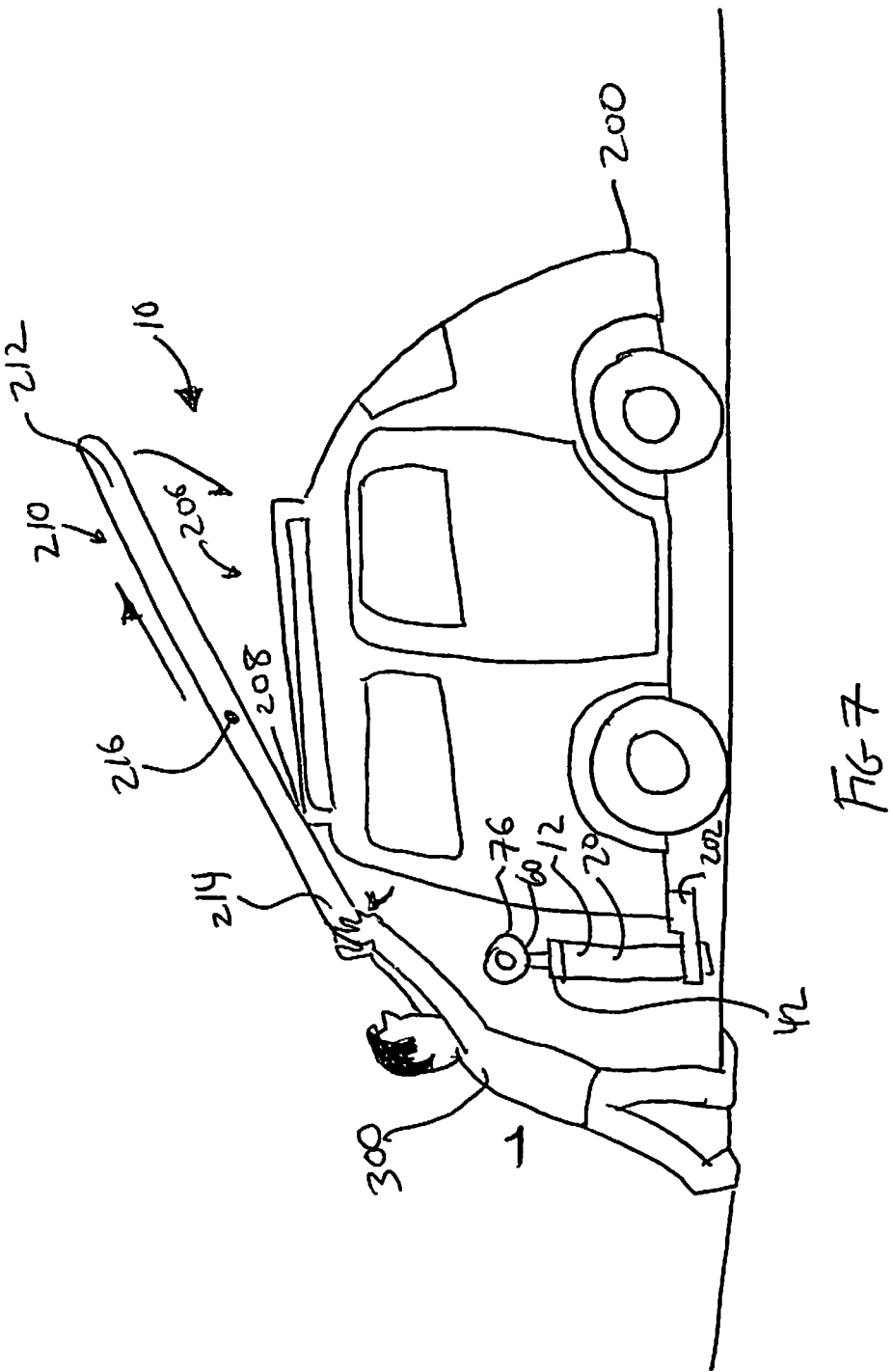
FIG. 7 is substantially an elevation view of the operator pushing the center of gravity for the object past the rear edge to cause the front portion to swing down upon the top of the vehicle
Figure 8:
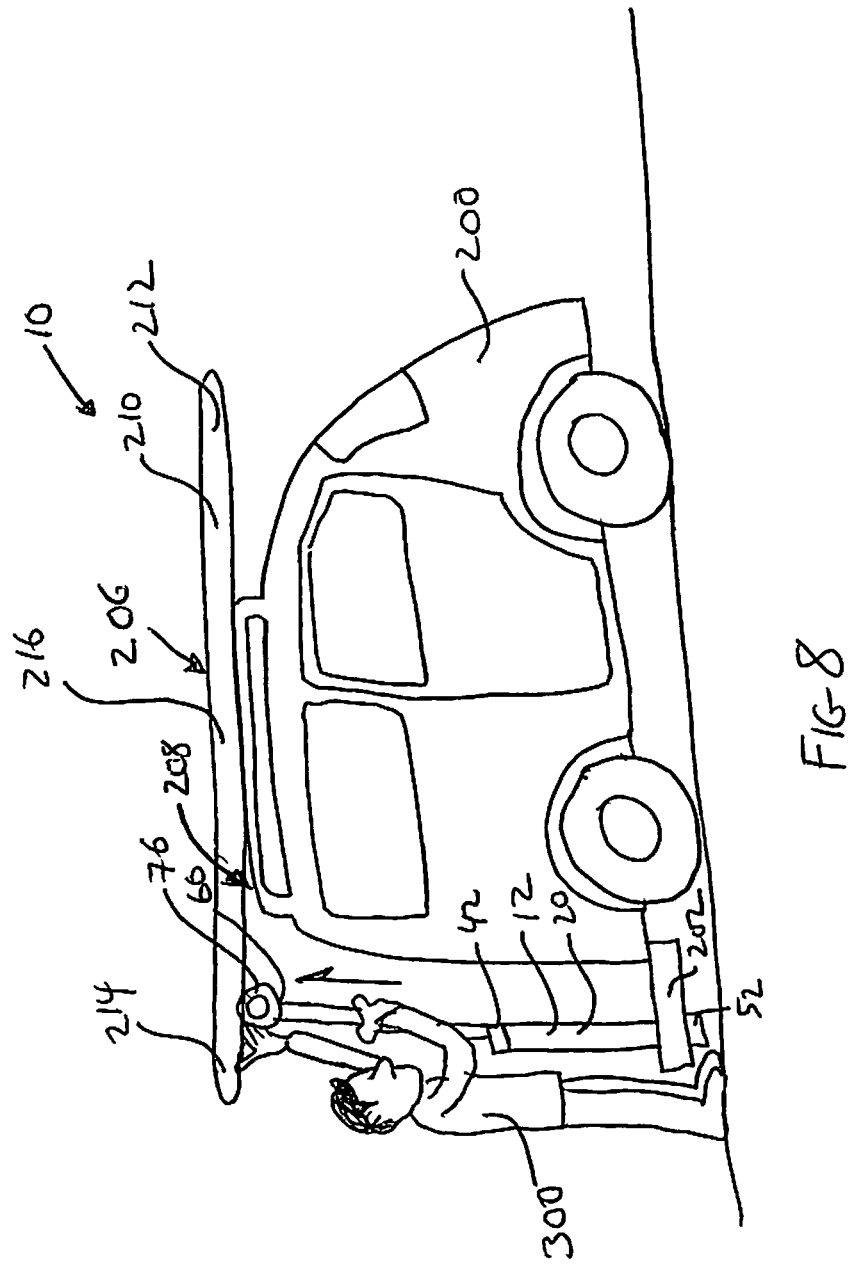
FIG. 8 is substantially an elevation view of the operator adjusting the rack to raise the height of the rollers to support the overhanging rear portion of the object.
Figure 9:
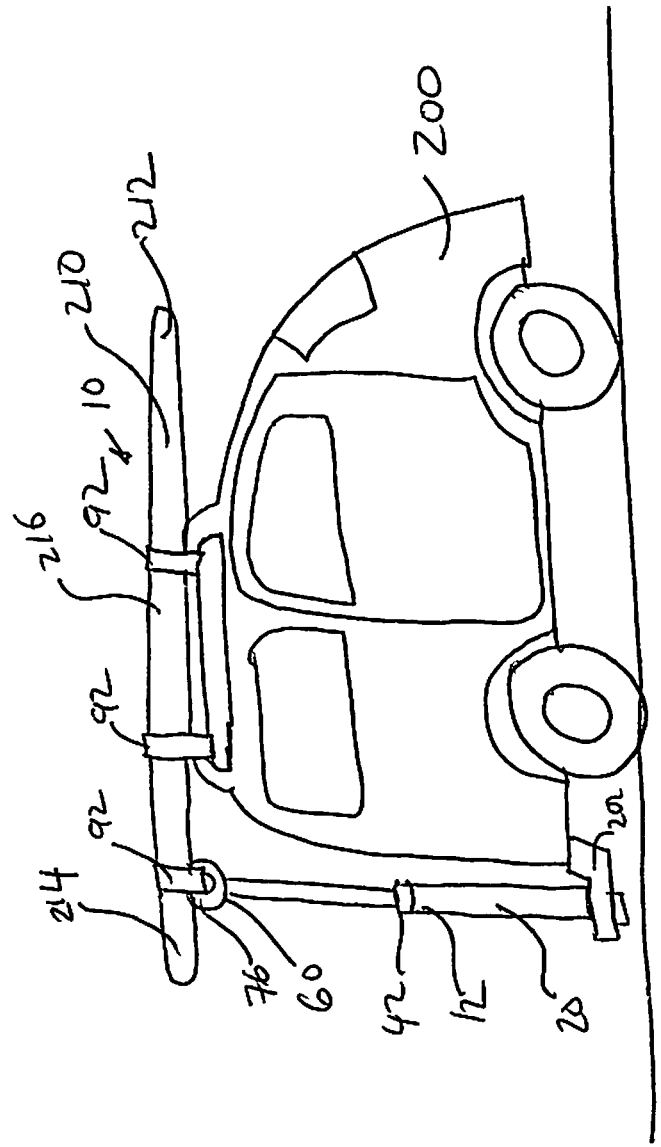
FIG. 9 is substantially an elevation view of the object secured to the rack and vehicle and ready for transport.
Figure 10:
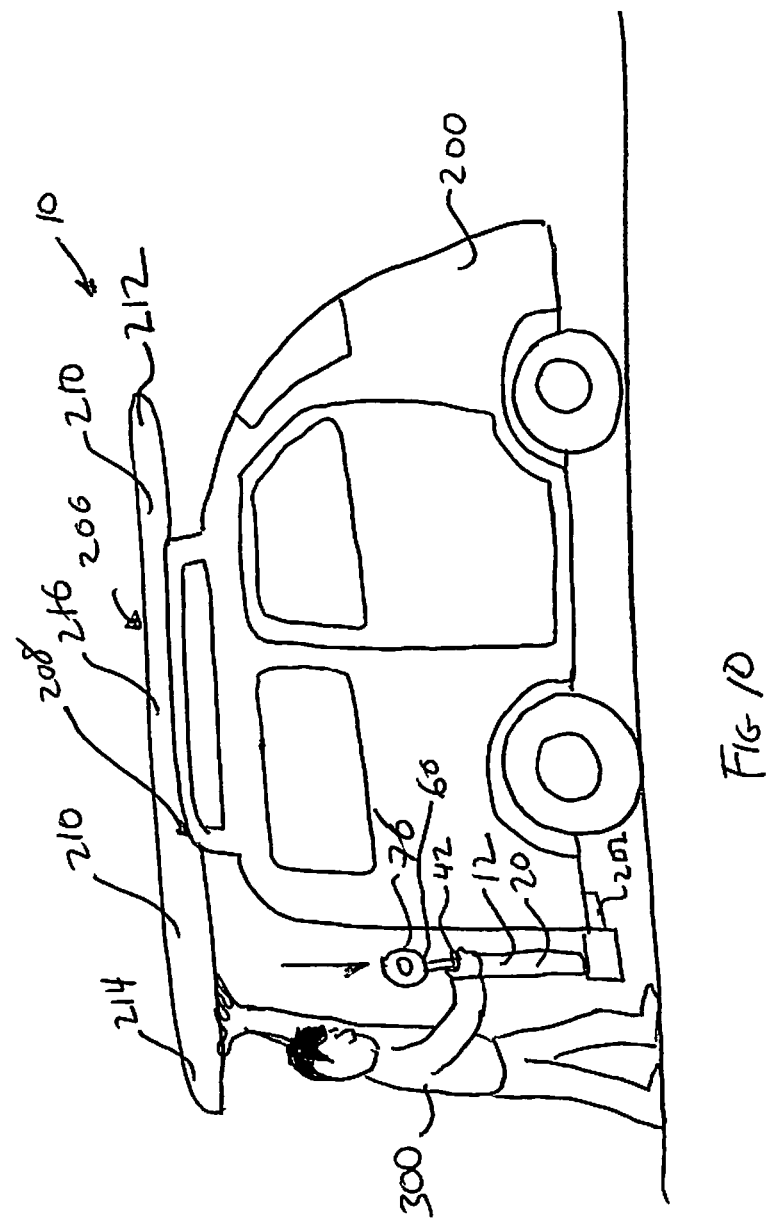
FIG. 10 is substantially an elevation view of the operator lowering the roller away from the overhanging rear portion in preparation to remove the object from the vehicle.
Figure 11:
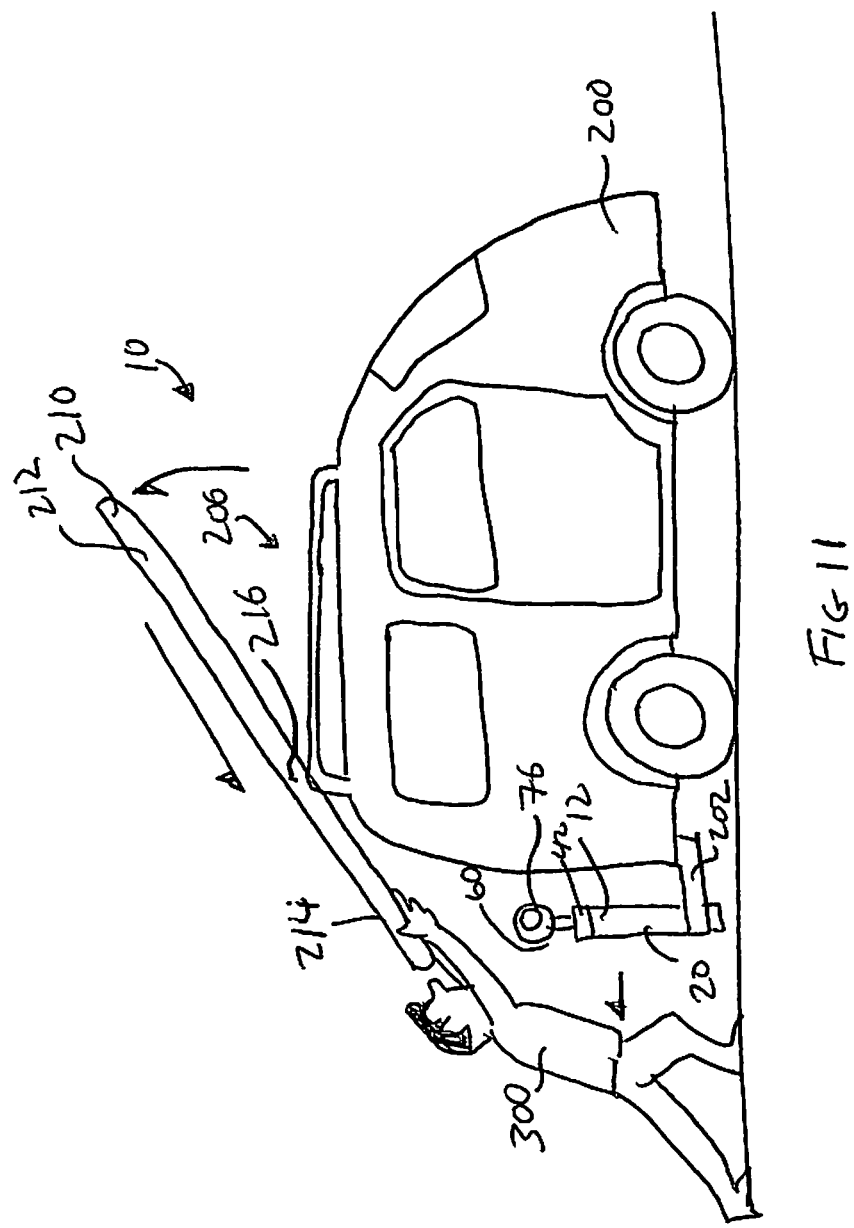
FIG. 11 is substantially an elevation view of the operator grasping the rear portion of the object to bring center of gravity of the object to the rear edge to pivot the rear portion down towards the rack.
Figure 12:
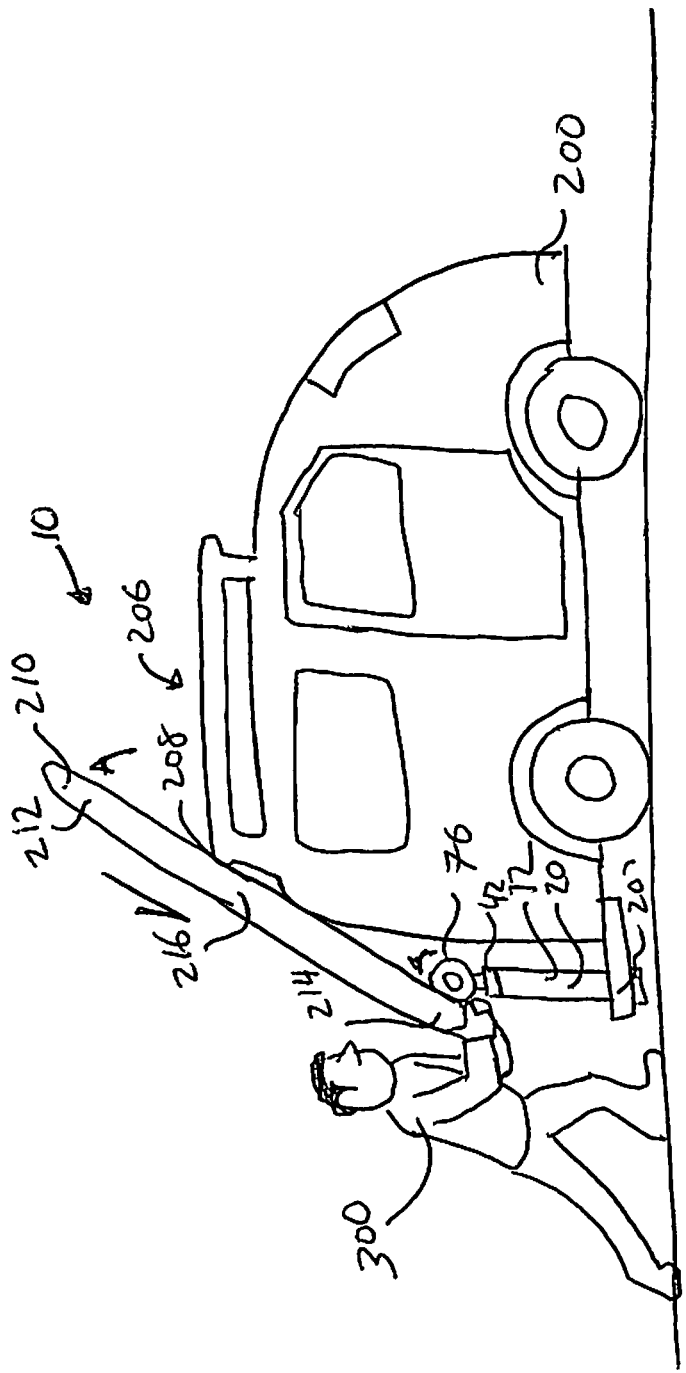
FIG. 12 is substantially an elevation view of the operator bringing down and angling the rear portion of the object to contact the rollers.
Figure 13:
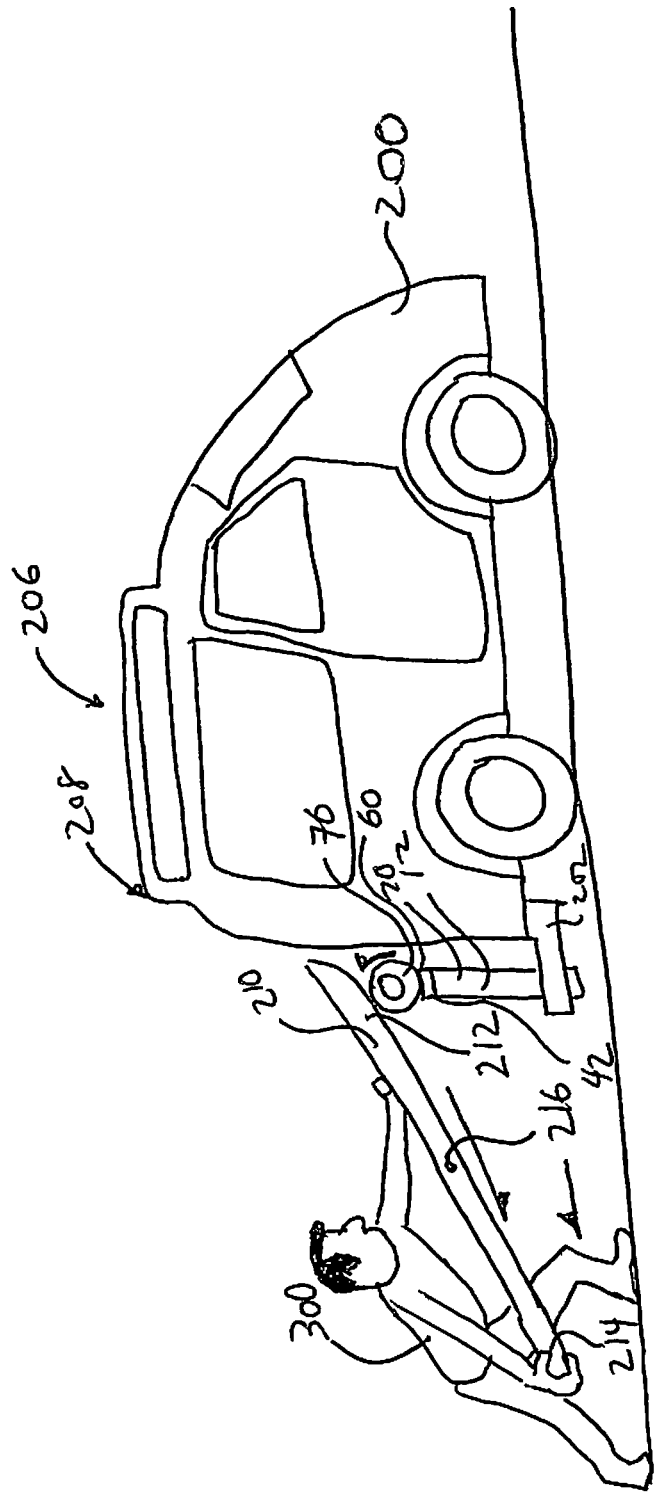
FIG. 13 is substantially an elevation view of the operator bringing the rear portion of the object away from the rollers.
Figure 14:
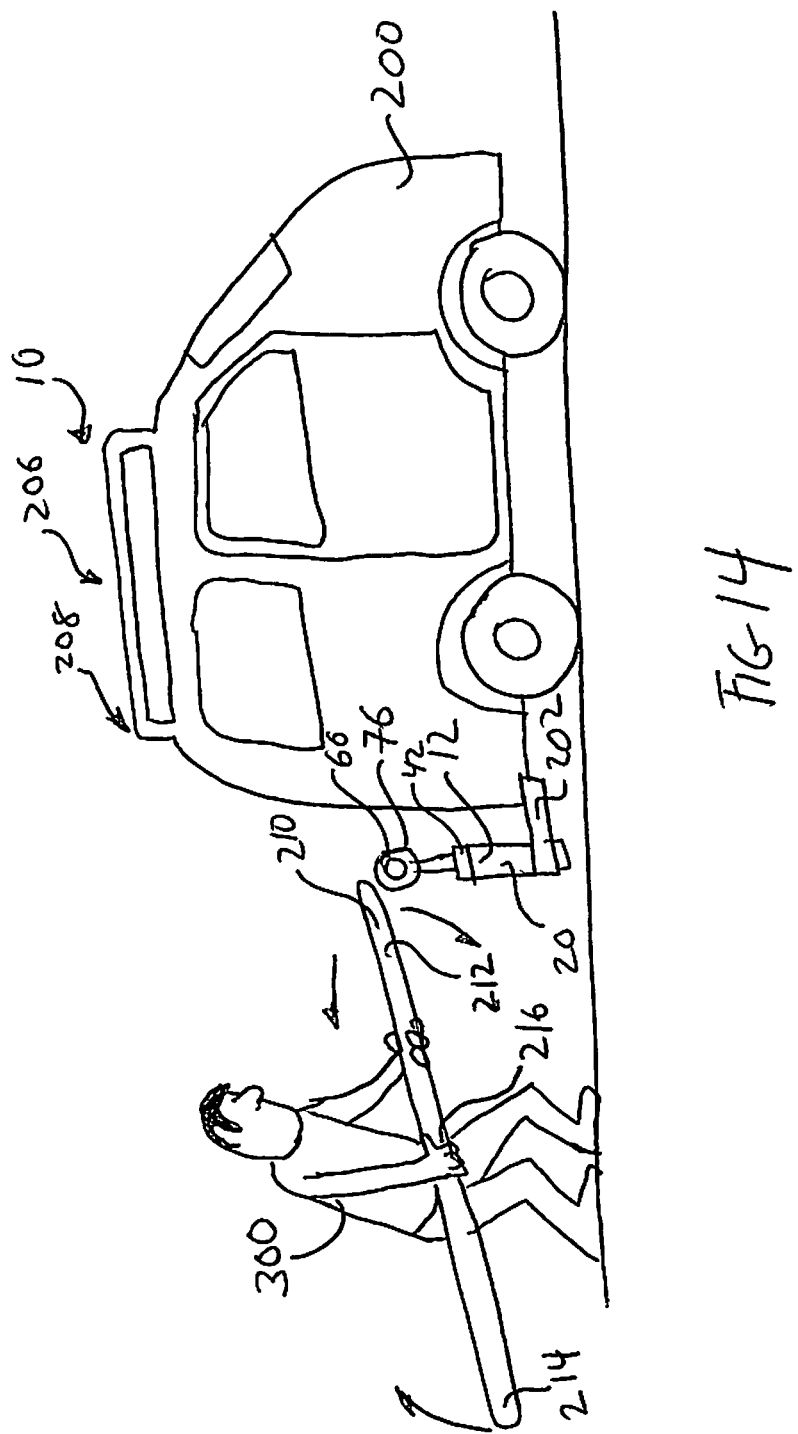
FIG. 14 is substantially an elevation view of the operator grasping center of gravity of the object and taking the front portion off of the rollers.
Figure 15:
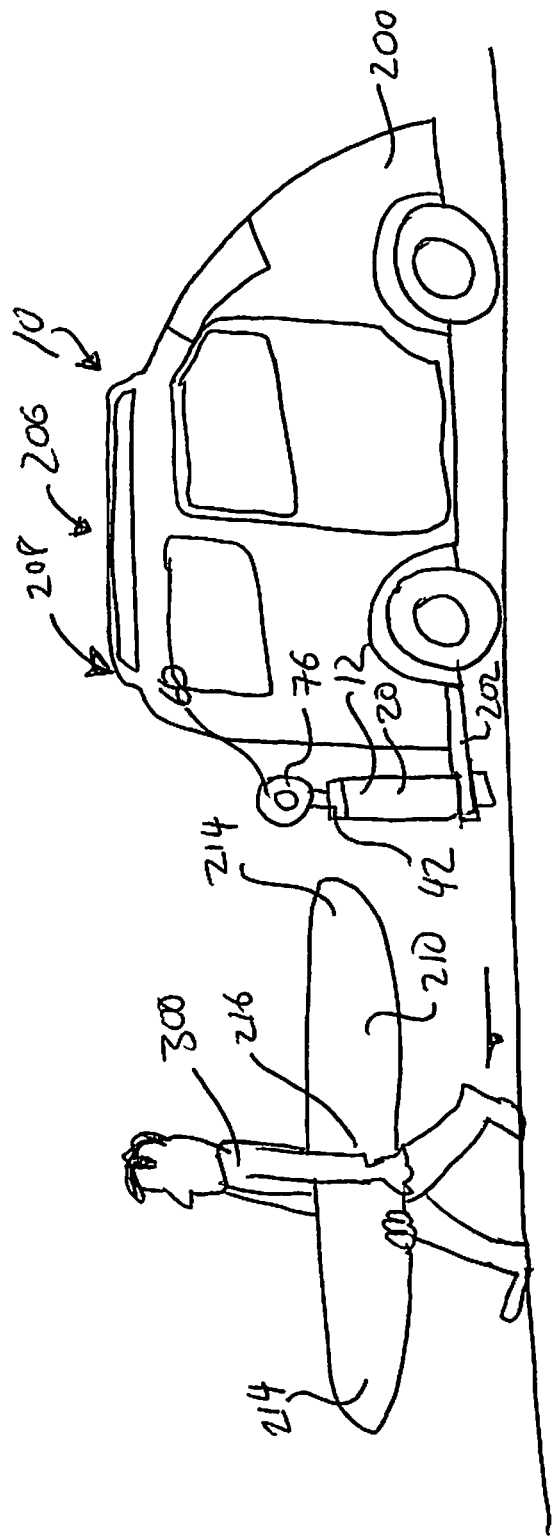
FIG. 15 is substantially an elevation view of the operator carrying the object distal from the invention.
Figure 16:
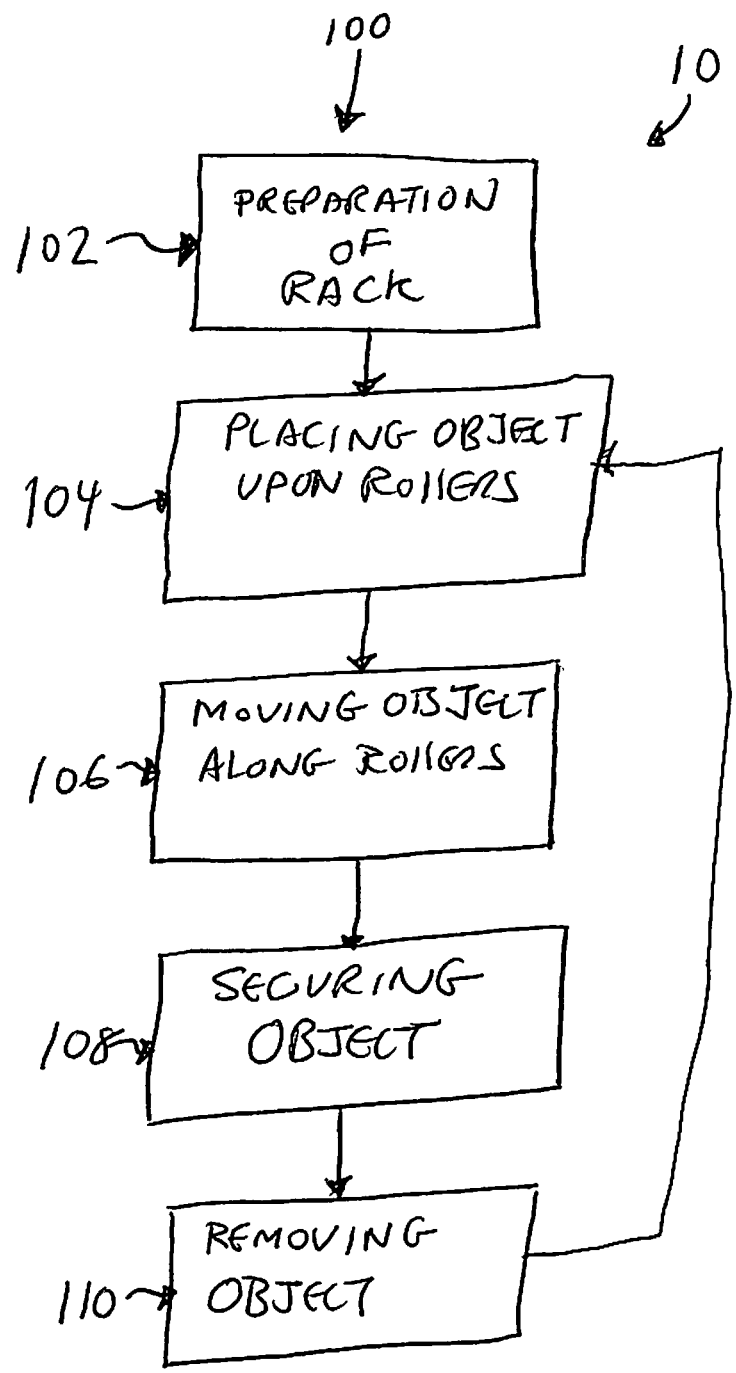
FIG. 16 is substantially flow chart of one possible embodiment for operating the rack.

As substantially shown in FIGS. 1 and 2, the telescopic rack 12 in one possible embodiment could comprise of vertical telescopic tube assembly 20 that connects perpendicularity to and bisects a top tube assembly 60. The vertical telescopic tube assembly 20 could comprise of an inner tube 22 movably received within a hollow outer tube 24. The inner tube 22 could have an attachment end 26 and a movable end 28, both ends 26, 28 could be open-ended to continuously connect a inner tube hollow interior 36 to an inner tube exterior 34. The outer tube 24 also could have two ends, a hitch attachment end 30 and a receiving end 32, that are also open-ended to continuously connect an outer tube hollow interior 38 to an outer tube exterior 40. The inner tube 22 could have a smaller diameter than the outer tube 24 to allow the movable end 28 of the inner tube 22 to pass through the receiving end of the outer tube 24 and into the outer tube hollow interior 38 further providing the inner tube 22 with a sliding fit within the outer tube 24.

The receiving end 32 of the outer tube 24 could feature a locking mechanism 42, such as a quick-release post clamp, to adjustably fix the positional relationship of the inner and outer tubes 22, 24 and to fix, as desired the overall length of the vertical telescopic tube assembly 20. In other embodiment that is not shown, a pair of laterally aligned holes on the inner tube 34 could be aligned with a selected pair of holes from a two sets of laterally aligned holes opposingly set on the outer tube to allow a fastener to penetrate the pair of aligned holes of the inner tube with a selected pair of aligned holes of the outer tube 24 to fix the overall length of the vertical telescopic tube assembly 20.

The hitch attachment end 30 of the outer tube 24 could have stepped contour 44 that is narrower in diameter that remaining portion of the outer tube 24. This reduction in diameter could allow the hitch attachment end 30 to pass through the hitch ball aperture 204 of the tow hitch (which is exposed once the ball hitch [not shown] is removed from the tow hitch 202) while not allowing the remaining portion of the outer tube 24 to pass through the tow hitch 202. This diameter transition also provides a stepped edge 46 upon which the outer tube 24 may sit upon the tow hitch 202 when the hitch attachment end 30 is fully seated in the tow hitch 202. The hitch attachment end 30 may at least partially enclose a plug or tube anchor 48 that re-enforces the vertical telescopic tube assembly's capability of attaching to a hitch and supporting loads placed upon it. The anchor 48, in at least one embodiment, could be a solid metal cylinder of definite length (e.g., with a stepped profile generally fits within the outer tube hollow interior 38 as defined by the stepped contour 46 of the hitch attachment end 30.) The anchor 48 could be retained within the hitch attachment end 30 through a variety of attachment means, such as one or more fasteners (not shown) laterally penetrating both the hitch attachment end 30 and the anchor 48, welding the anchor 48 in place within the hitch attachment end 30 (not shown), using adhesive to hold the anchor 48 in place (not shown) and the like.

The anchor 48 could further exposed an anchor end 50 at the opening of the hitch attachment end 30, the exposed anchor end 50 being drilled and tapped to reversibly accept a hitch anchor bolt 52. This bolt 52 in combination with one or more washers, can be used to reversibly engage the anchor 48 (e.g., hitch attachment end 30) after the hitch attachment end 30 passes into a hitch ball aperture 204 and allowing the stepped edge 46 of the outer tube 24 to secured against the tow hitch 202. In this manner, the bolt 52 reversibly secures the rack 12 to the tow hitch 202.

The attachment end 26 of the inner tube 22 could similarly further feature a solid insert 54 that is also tapped and threaded to receive a insert fastener 56 laterally passing through a center point of the top tube 62 to generally anchor the top tube assembly 60 to the attachment end 62 and at the same time bisecting the top tube assembly 60. In an alternative embodiment, the top tube 62 could be attached to the inner tube's attachment end 26 using a non-fastener based means (not shown) such as welding and the like.

The top tube assembly 60 could comprise of a top tube 62 of a definite length having two top tube open ends 66 that continuously connect a top tube hollow interior 68 to an top tube exterior 64, a pair of top tube inserts 70, a pair of end caps 72, pair of end cap fasteners 74, and a pair of padded rollers 76. As stated above, the top tube assembly 60 may be bisected by the attachment end 26 of the inner tube 22; this resulting bisection generally denotes two tube assembly halves 78. Each tube assembly half 78 could have its own padded roller 76. Each padded roller 76 could comprise of a cylindrical roller tube 80 of definite length and having two open roller ends 82 continuously connecting a roller hollow interior 84 to an roller exterior 86. The diameter of the roller tube 80 may be greater than that of diameter of the top tube itself, allowing a respective roller 80 to slip over its respective portion of the top tube 62 so that the roller 80 can freely rotate about its respective portion of the top tube 62. The exterior 86 of the roller tube 80 could further have applied to it an appropriately thick layer of roller padding 88. In at least one embodiment, this roller padding 88 could be made from extruded high polymer density flexible polyurethane foam.

Each tube insert 70 could be cylindrically-shaped and could have a portion of its exterior threaded, this threaded portion could then engage a reciprocal threaded portion of the top tube 62 (e.g., an interior wall) to hold the tube insert 70 in place in the top tube open end 66. Other means (not shown) of attaching the tube insert 70 to the top tube end 66 could also be used and still be considered within the purview of the invention 10. The tube insert 70 could be placed in the top tube end 66 so that a portion of the tube insert 70 extends past and out of the top tube open end 66. The tube insert 70 could be further tapped and threaded at its end of its exposed portion to receive an end cap fastener 74 used to retain an end cap 72 onto the end of the top tube 62. The fastener in one possible embodiment could be a eyelet bolt wherein the eyelet 90 could be used to respectively attach an end of a strap 92 that is used to secure a rear portion 214 of an object (i.e., that is loaded upon the top 206 of the automotive vehicle 200) to the top tube assembly 60.

The inner tube 22, outer tube 24, top tube 62 could be made from lightweight high tensile strength metals, carbon fiber or other suitable materials as known by those skilled in the art. The anchor 48 could be made from steel while the bolt 52 could be made from stainless steel.

As substantially shown in FIGS. 3 through 16, the first step of the process or methodology 100 of using the hitch-mounted telescopic rack could be step 102, preparation of the rack. In this step, the operator 300 after deciding on an object (s) 210 to place upon the top 206 of an automotive vehicle 200 with a tow hitch 202 could first remove the ball hitch assembly from tow hitch exposing ball hitch aperture. The operator 300 could then grasp the telescopic rack 12 (after removing the bolt/washer combination from the anchor) and insert the hitch attachment end into the ball hitch aperture. The operator 300 then could reattach the bolt/washer combination to the anchor to reversibly lock the telescopic rack in place on the tow hitch to generally locate the vertical telescopic tube assembly 20 in a vertical orientation with the top tube assembly 60 in a horizontal orientation (and also having the top tube assembly 60 in a parallel relationship to the rear edge of the top of the automotive vehicle.)

Once telescopic rack is attached to the tow hitch, the operator 300 could adjust the height of the top tube assembly 60 (e.g., roller placement) by adjusting the length of the vertical telescopic tube assembly 20 through the loosening of the locking mechanism to allow movement between the outer tube and the inner tube. Once the desired length for the vertical telescopic tube assembly 20 has been obtained, the operator can fix assembly at the desired length by reengaging the locking mechanism 42. The height of the rollers 76 is generally set to allow the rollers 76 to support and aim the front portion of the object 210 up towards the rear edge 208 of the top 206 of the automotive vehicle 200 when the rear portion 214 of the object 210 is held below the height of the rollers 76. In at least one embodiment, the height of the rollers 76 (top tube assembly 60) is could be two thirds (⅔) of the distance between the height of the top 206 of the automotive vehicle 200 and the height of the tow hitch 202. Once this step is substantially completed, the process 100 could proceed to step 104, placing the object upon rollers.

At step 104, placing the object upon the rollers, the operator 300 in one possibly embodiment could be generally grasping the object 210 (e.g., a standup paddle board, etc.) and holding its middle portion (e.g., the location of it's center of gravity 216) proximate to the operator's waist while balancing the object 210 so that it is held away from and parallel to the ground. The operator 300 could then place front portion 212 of the object 201 upon the rollers 76 and then lower the rear portion 214 below the height of the rollers 76 to angle the object 210 up towards the rear edge 208 of the top 206 of the automotive vehicle 200. Once this step is substantially completed the process 100 could generally move onto the next step 106, moving the object along rollers.

In step 106, moving the object along rollers, the operator 300 could shift its grasp of the object 210 from the object's center of gravity 216 to the rear portion 214. Pushing the object 210 by its rear portion 214 before him to move the rear portion 214 towards rollers 76 while at the same time maintaining the angled positioning of the object 210, this movement of the object 210 along the rollers 76 could move the front portion 212 up towards to the rear edge 208 of the top 206 of the automotive vehicle 200. As the front portion 212 contacts and then continues to be moved over the rear edge 208 and then over the top 206, the object's center of gravity 216 is correspondingly moved over the rear edge 208 causing weight of the object 210 to swing the front portion 212 down to contact the top 206 (e.g., roof rack). At this point during the movement of the object 210 by the operator 300, the object 210 (e.g., the rear portion 214) generally leaves contact with the rack 12 (e.g., the rollers 76) and swings up to overhang the rear of the automotive vehicle 200. The operator 300 may continue to further push the object 210 in the desired direction along the top 206. Once this step is completed, the process 100 may generally continue onto step 108, securing the object.

In step 108, securing the object, the operator 300 may release or otherwise loosen the lock mechanism 42 to extend the length of the vertical telescopic tube assembly 20 to place the rollers 76 in contact with the underside of the object's overhanging rear portion 214 to support it. The lock mechanism 42 can then be reengaged to fix the vertical telescopic tube assembly's length to hold the rollers 76 at the desired height. At this time, the operator 300 can further secure the object 210 to the top 206 of the automotive vehicle 200 (e.g., tie the object 300 to various points of the roof rack). The operator 300 can take a strap 92 and attach it to both ends of top tube assembly 60. In this manner, a strap 92 attached to the top tube assembly 60 secures the rear portion 214 to the rollers 76. At this time, the operator (or others) can use the motor vehicle 200 to transport the object 210 to the desired location. At the substantial completion of this step, the process 100 can move to the next step 110, removing the object.

At step 210, removing the object, after the vehicle 200 has been used to delivered the object 210 to a desired destination, the operator 300 can unsecure the object 210 from the top 206 (e.g., detach the object 210 from the roof rack by removing straps, 92 bindings, and the like holding it to the roof rack, as well as remove any strap 92 or binding being used to secure the rear portion 214 to the rollers 76. The operator 300 can then lower the top tube assembly 60 to bring the rollers 76 down to desired height (two thirds of the distance between top 206 and the tow hitch 202.) The operator 300 can then grasp and pull on the rear portion 214, directing it away from the top 206 of the automotive vehicle 200 until the object's center of gravity 216 is moved towards the rear edge 208 of the top 206. The operator 300 could pivot the center of gravity 216 about the rear edge 208 to tip up the front portion 212 up and away from the top 206 and tip down the rear portion 208 towards the rollers 76. In this angled position of the object 210, the operator 76 continues to move the object 210 off the top 206 of the automotive vehicle 200 until the rear portion 214 contacts the rollers 76. The rear portion 214 may then be rolled down and off the rollers 76 and is held below the height of the rollers 76. As operator continuously moves away from the rollers 76 to move the rear portion 214 away from the rollers 76, this angled movement or action may also cause the front portion 212 to simultaneously move away from and clear the rear edge 208. As the object 210 continues to be moved on the rollers 76, the rear portion 212 may be brought level with height of the rollers 76 as the front portion 212 comes into contact with the rollers 76. At this point, the operator 300 stops moving the object 210 to shifts its grasp of the object 210 from its rear portion 214 to the middle of the object (e.g., proximate to its center of gravity 216) so that the object 210 is generally no longer angled but parallel to the ground at the operator's waist height. At this time, the operator 300 may his grasp of the object 210 fairly well balanced and under control to the extent that the operator 300 may then lift the front portion 212 off of the rollers 76. The operator 300 may then carry the object 210 away from the invention 10 to generally deliver the object 210 (e.g., a standup paddle board) to its ultimate destination (e.g., a shoreline) and commence using the object 210 (e.g., surfing, floating, and alike). As needed, the process 200 can return to step 204 as needed.

Conclusion

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the example.

As shown in this application, the invention is lightweight, inexpensive, easy-to-use hitch-mounted telescopic rack that can be used to load and unload objects relative to a top of an automotive vehicle. The rack's telescopic nature and its attachment to a tow hitch also allow the rack to support overhanging objects as they are loaded upon the automotive vehicle. The rollers with their adjustable height and horizontal orientation allow the objects to be rolled on and off them with respect to the angled movement of the object relative to the rear edge of the top of the vehicle.

What is claimed is:

1. A hitch-mounted telescopic rack comprising of:
   (A) a vertical telescopic tube assembly having an inner tube and a hollow outer tube, the hollow outer tube having a receiving end and a hitch attachment end, the inner tube having an attachment end and a movable end, the movable end being movably received within the receiving end of the hollow outer tube;
   (B) a top tube assembly attaching to the attachment end of the inner tube and supporting one or more rollers, the top tube assembly further having a perpendicular orientation to the vertical telescopic tube assembly;
   wherein the hitch attachment end is removably received within and secured to the trailer hitch of an automotive vehicle to vertically orient the vertical telescopic tube assembly and to horizontally place the one or more rollers distally from the trailer hitch to allow the one or more rollers rotate and be used to move an object relative to a rear edge of a top of the automotive vehicle, the vertical telescopic tube assembly further having a capability of adjusting a length of the vertical telescopic tube assembly to place the one or more rollers at a height that is two thirds of a distance between the top and the tow hitch of the automotive vehicle.

2. The hitch-mounted telescopic rack of claim 1 wherein the one or more rollers is a tube with two open ends that continuously connects a roller exterior with a roller interior.

3. The hitch-mounted telescopic rack of claim 2 wherein the one or more rollers further comprises a padded covering enclosing the roller exterior.

4. The hitch-mounted telescopic rack of claim 1 wherein the top tube assembly further comprises a top tube, the one or more rollers encompasses and rotates about a portion of the top tube.

5. The hitch-mounted telescopic rack of claim 4 wherein the top tube has two top tube ends continuously connecting a top tube hollow interior to an top tube exterior, the one or more rollers movably encompassing a portion of the top tube exterior located proximate to at least one of the respective top tube open ends.

6. The hitch-mounted telescopic rack of claim 5 wherein a top tube insert is inserted through each the top tube open end and an end cap is attached to the top tube insert, the end cap movably retains the one or more rollers upon the top tube proximate to the respective top tube open end.

7. The hitch-mounted telescopic rack of claim 6 wherein an eyelet bolt penetrates the end cap to attach it to the top tube insert, an eyelet of the eyelet bolt being removably attached to a respective end of a strap that is used to secure a rear portion of the object to the top tube assembly.

8. The hitch-mounted telescopic rack of claim 1 wherein the top tube assembly is bisected by the vertical telescopic tube assembly into two tube assembly halves, each tube assembly halve having its own roller.

9. A combination of telescopic rack and an automotive vehicle with a tow hitch comprising of:
   (A) a telescopic rack having a vertical telescopic tube assembly and a top tube assembly, the vertical telescopic tube assembly having a hitch attachment end and a supporting end, the supporting end perpendicularly attaches the vertical telescopic tube assembly to a top tube assembly that movably supports one or more rollers, the vertical telescopic tube assembly has a capability to adjust a length of the vertical telescopic tube assembly to place the one or more rollers at a height that is two thirds of the distance between a top and a tow hitch of the automotive vehicle;
   (B) an automotive vehicle having a tow hitch and a top with a rear edge;
   wherein the telescopic rack is connected by the hitch attachment end to the tow hitch so as to place the vertical telescopic tube assembly in a vertical position with the one or more rollers in a horizontal position, allowing an object to move along and rotate the one or more rollers, the one or more rollers allowing the object to move in angled manner for passage over the rear edge to allow the object to rest upon the top of the automotive vehicle.

10. The combination of claim 9 wherein the top tube assembly has a top tube, the one or more rollers encompasses and rotates about a portion of the top tube.

11. The combination of claim 9 wherein the top tube assembly has two open tube ends, each tube end having the one or more rollers proximate to it.

12. The combination of claim 9 wherein the angled manner allows a front portion of the object to contact one or more rollers and direct the front portion of the object upward towards to a rear edge of the top of the automotive vehicle.

* * * * *